(12) United States Patent
Chen et al.

(10) Patent No.: US 8,259,396 B2
(45) Date of Patent: Sep. 4, 2012

(54) LASER SYSTEM AND LASER BEAM SHAPING AND HOMOGENIZING DEVICE THEREOF

(75) Inventors: Cheng-Huan Chen, Hsinchu (TW);
Po-Chou Chen, Hsinchu (TW);
Chien-Chuan Chen, Hsinchu (TW);
Po-Hung Yao, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 255 days.

(21) Appl. No.: 12/814,614

(22) Filed: Jun. 14, 2010

(65) Prior Publication Data
US 2010/0328773 A1     Dec. 30, 2010

(51) Int. Cl.
*G02B 27/10* (2006.01)
(52) U.S. Cl. .............. 359/622; 359/621; 359/741
(58) Field of Classification Search .......... 359/619, 359/621–624, 741, 796
See application file for complete search history.

(56) References Cited

U.S. PATENT DOCUMENTS

| | | | | |
|---|---|---|---|---|
| 6,124,975 A | * | 9/2000 | Dona et al. | 359/626 |
| 6,381,072 B1 | * | 4/2002 | Burger | 359/622 |
| 6,621,639 B2 | * | 9/2003 | Kahlert et al. | 359/622 |
| 2003/0161047 A1 | * | 8/2003 | Lee et al. | 359/624 |
| 2009/0067055 A1 | * | 3/2009 | Yamamura | 359/622 |
| 2009/0122412 A1 | * | 5/2009 | Steenblik et al. | 359/626 |
| 2010/0033829 A1 | * | 2/2010 | Wippermann et al. | 359/623 |

FOREIGN PATENT DOCUMENTS
WO     WO 2008/043491     *     4/2008

* cited by examiner

*Primary Examiner* — Jordan Schwartz

(57) ABSTRACT

A double-sided microlens array is applied to a laser beam shaping and homogenizing device of a laser system. The double-sided microlens array is able to shape the energy distribution of an incident laser beam to a square and flat-top beam with the average uniformity of energy and comprises a base plate, a plurality of first micro lenslets and a plurality of second micro lenslets. The first micro lenslet and the second micro lenslet have the convexes with the same figures and comply with the classification of an optical diffractive element, the first micro lenslets and the second micro lenslets are disposed on the first surface and the second surface of the base plate, which are corresponding to each other in order to tightly line up the arrangements of arrays. The first micro lenslets and the second micro lenslets are correspondingly misalignment.

5 Claims, 7 Drawing Sheets

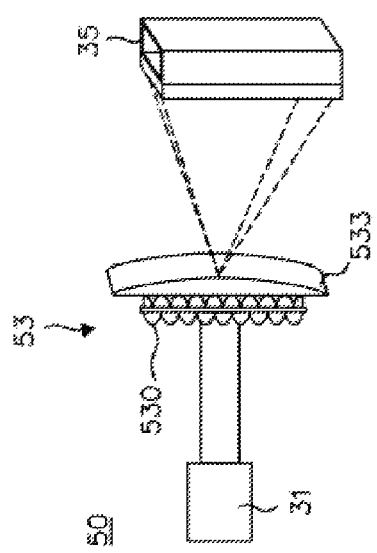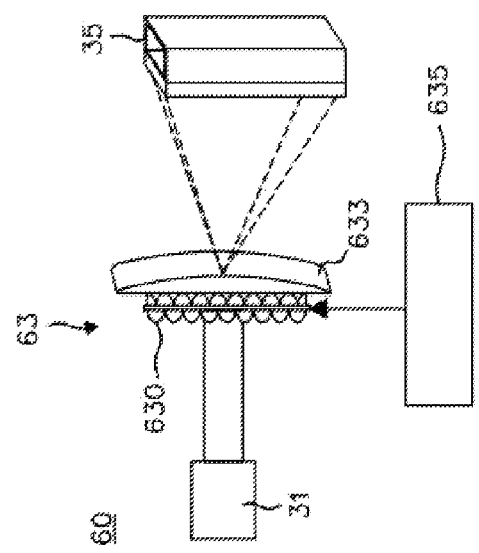

LASER SYSTEM AND LASER BEAM SHAPING AND HOMOGENIZING DEVICE THEREOF

CROSS-REFERENCE TO RELATED APPLICATION

This application claims foreign priority from a Taiwan Patent Application, Ser. No. 098121469, filed on Jun. 26, 2009.

BACKGROUND OF THE INVENTION

1. Field of the Invention

The present invention generally relates to a laser system, more particularly, to a laser system that has double-sided microlens arrays so as to shaping and homogenizing a laser beam.

2. Description of the Prior Art

Projector normally adopts a laser system, which is able to project colorful images with the features of high resolution, high saturation and wide-color-gamut, so that the colors of a screen may be distinct and vivid and closer to natural things. Due to that of a laser beam projected from a light source being a must to meet with the conditions of the shape of the screen and uniform illumination and a circular beam with the Gaussian Distribution of energy, the laser beam shall be shaped and homogenized in order to alter the figure and the energy distribution thereof when the laser beam is as a light source.

With references to FIG. 1, FIG. 2 and FIG. 3, which illustrate a schematic view of a laser beam shaping and homogenizing device, a schematic view of an energy distribution of an incident beam of FIG. 1 and a schematic view of an energy distribution of an emergent beam of FIG. 1. As shown in the figures, the laser beam shaping and homogenizing device 10 is disposed at the path of the laser beam. The circular incident beam with the Gaussian-distributed energy goes through the laser beam shaping and homogenizing device 10, thus the emergent beam becomes a square and flat-top beam with the average uniformity of energy.

Generally speaking, the laser beam shaping and homogenizing device 10 is constructed by some diffractive optical elements, and a microlens array is one embodiment of such diffractive optical elements. The microlens array is actually disposed on the surface of a laminar base plate with lots of micro lenslets. The dimensions of the micro lenslets comply with the classification of the optical diffractive element, and the micro lenslets are tightly lined up the arrangement of a square array.

While the laser beam goes into the microlensl array, the phenomenon of diffraction is thus happening. Continuously, the diffractive light waves pass through the microlens array, the overlapped light waves are reassembled to form the square and flat-top beam. Further, with the projection distance being longer, the uniformity of the laser beam going through the microlens array is rapidly worse. That is, the energy distribution of near field projection spots of the laser beam being just projected from the microlens array is very uniform; on the contrary, the far field projection spots are changed to a dispersed spot array, which cannot meet with the requirements of the uniformity of a projection device/system. Therefore, some other components for the projection device/system must be added to compensate the uniformity of the laser beam, e.g. vibration components to vibrate a projection display in order to achieve the effect of uniform illumination.

The present invention is thus developed based on the shortcomings of prior arts so as to improve the laser beam shaping and homogenizing device and the laser system.

SUMMARY OF THE INVENTION

The first objective of the present invention is to provide a double-sided microlens array, which adopts two misalignment microlens arrays on the two opposite surface of a base plate to build up the conditions of diffraction in order to promote the uniformity of the energy of an emergent laser beam.

The second objective of the present invention is to provide a laser system and a laser beam shaping and homogenizing device thereof, which shapes and homogenizes the laser beam through the double-sided microlens array so as to provide the projected laser beam with a uniform illumination.

The present invention discloses the double-sided microlens array, which comprises a base plate, a plurality of first micro lenslets and a plurality of second micro lenslets, wherein the base plate has a first surface and a second surface, the first surface and the second surface are parallel to each other, each first micro lenslet is a convex and has a curve surface and complies with the classification of an optical diffractive element, the first micro lenslets are disposed on the first surface in order to tightly line up the arrangement of a first array pattern. The second micro lenslets meet with the first micro lenslets and are disposed on the second surface, the second micro lenslets are tightly lined up the arrangement of another array. Wherein the first array pattern and the second array pattern are about the same, the position of the first array pattern on the first surface and the position of the second array pattern on the second surface have a comparative position difference, so that the first micro lenslets and the second micro lenslets are correspondingly misalignment.

The present invention discloses the laser beam shaping and homogenizing device, which is adapted to shape and homogenize a laser beam and comprises a double-sided microlens array, being disposed at the path of the laser beam and comprising: a base plate, a plurality of first micro lenslets and a plurality of second micro lenslets. The base plate has a first surface and a second surface, the first surface and the second surface are parallel to each other and about vertical to the path of the laser beam, each first micro lenslet is a convex and has a curve surface and complies with the classification of an optical diffractive element, the first micro lenslets are disposed on the first surface in order to tightly line up the arrangement of a first array pattern. The second micro lenslets meet with the first micro lenslets and are disposed on the second surface, the second micro lenslets are tightly lined up the arrangement of another array. Wherein the first array pattern and the second array pattern are about the same, the position of the first array pattern on the first surface and the position of the second array pattern on the second surface have a comparative position difference, so that the first micro lenslets and the second micro lenslets are correspondingly misalignment.

Preferably, the laser beam shaping and homogenizing device further comprises a cylindrical lens, which is disposed at the path of the laser beam and close to the doubled-sided microlens array.

The present invention discloses a laser system, which comprises the laser beam shaping and homogenizing device and a laser source, wherein the laser source generates the laser beam.

Hence, the double-sided microlens array, the laser beam shaping and homogenizing device and the laser system of the present invention adopts the comparative position difference between the first microlens array and the second microlens array to build up the conditions of diffraction, therefore the laser beam through the first microlens array and the second microlens array may generate two-time diffraction phenomena, so that the energy uniformity of the emergent laser beam is highly increased, and the laser system provides high-quality projected beam with uniform illumination.

Other and further features, advantages, and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits, and advantages of the preferred embodiments of the present invention will be readily understood by the accompanying drawings and detailed descriptions, wherein:

FIG. 9 illustrates a schematic view of a second preferred embodiment of the framework of the laser system and the laser beam shaping and homogenizing device of the present invention; and FIG. 10 illustrates a schematic view of a third preferred embodiment of the framework of the laser system and the laser beam shaping and homogenizing device of the present invention.

DETAILED DESCRIPTION OF THE INVENTION

The present invention provides a double-sided microlens array that is adapted to shape and homogenize a laser beam in a laser system.

Figure 1:
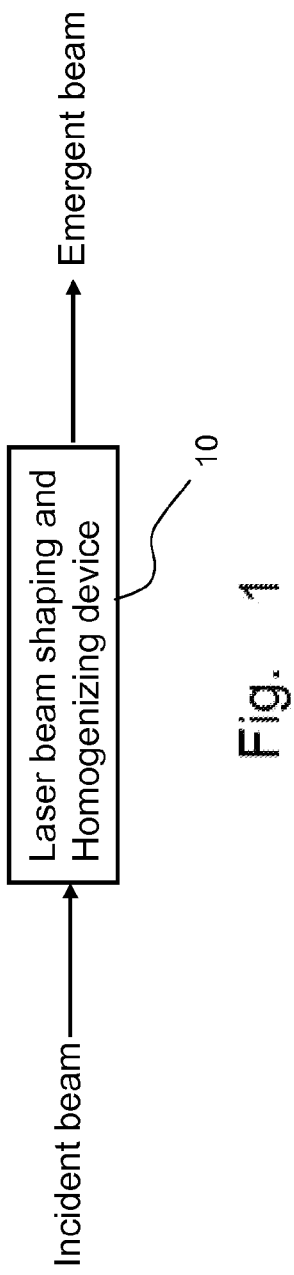
FIG. 1 illustrates a schematic view of a laser beam shaping and homogenizing device.
Figure 2A:
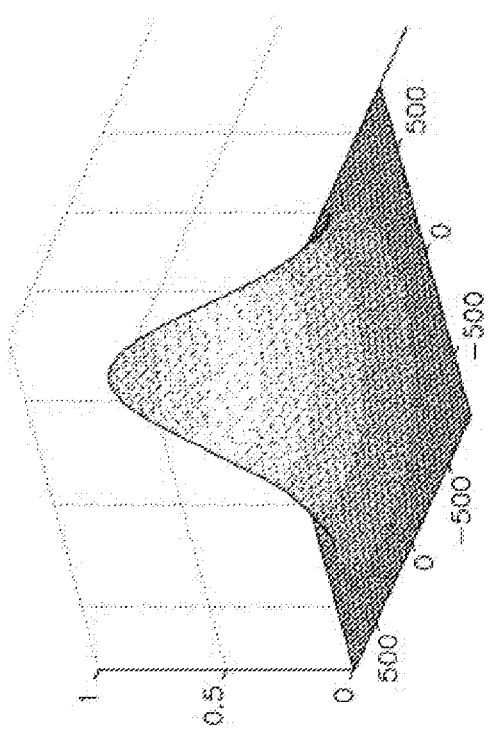
FIG. 2 illustrates a schematic view of an energy distribution of an incident beam of FIG. 1.
Figure 2B:
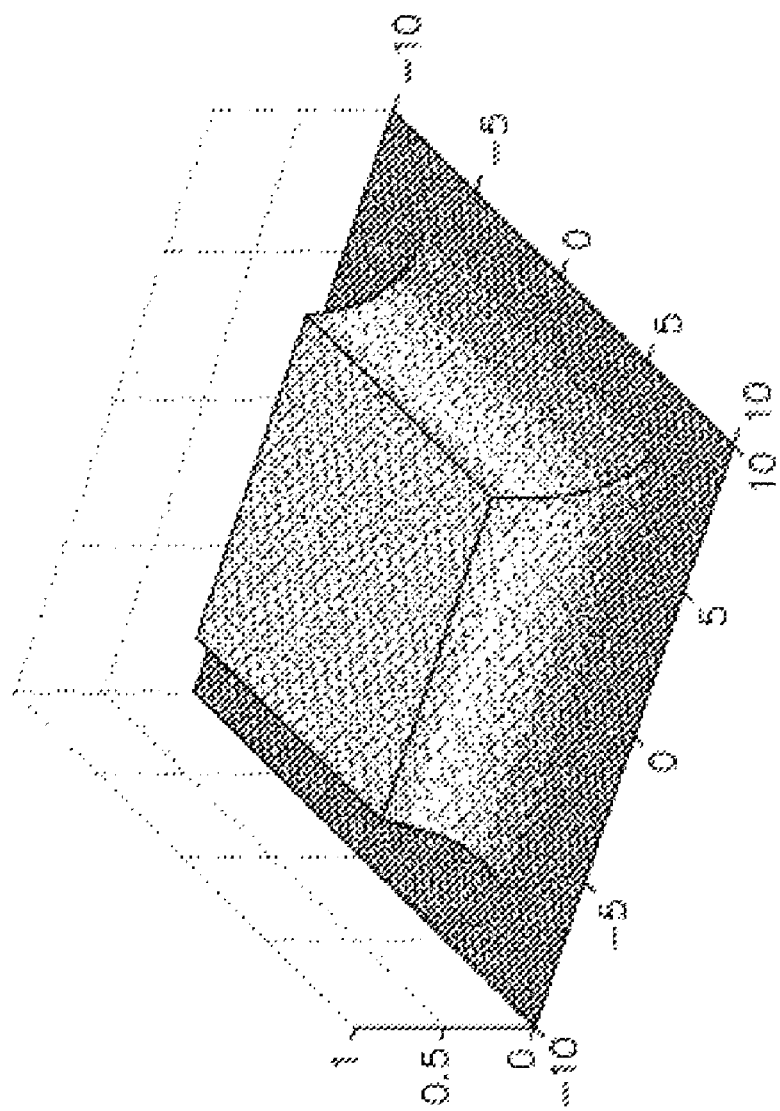
Figure 3:
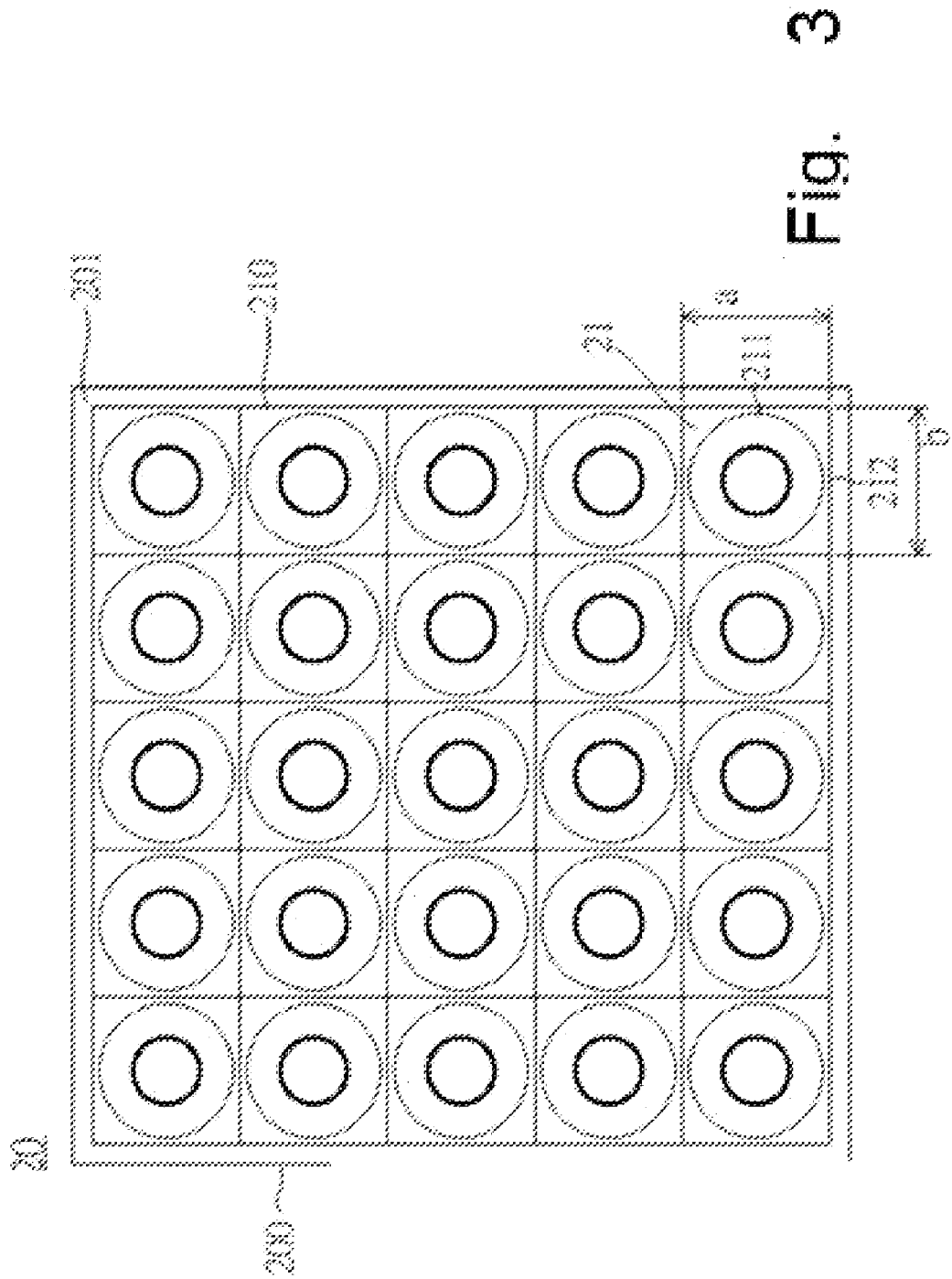
FIG. 3 illustrate a schematic front view of a preferred embodiment of the double-sided microlens array of the present invention.
Figure 4:
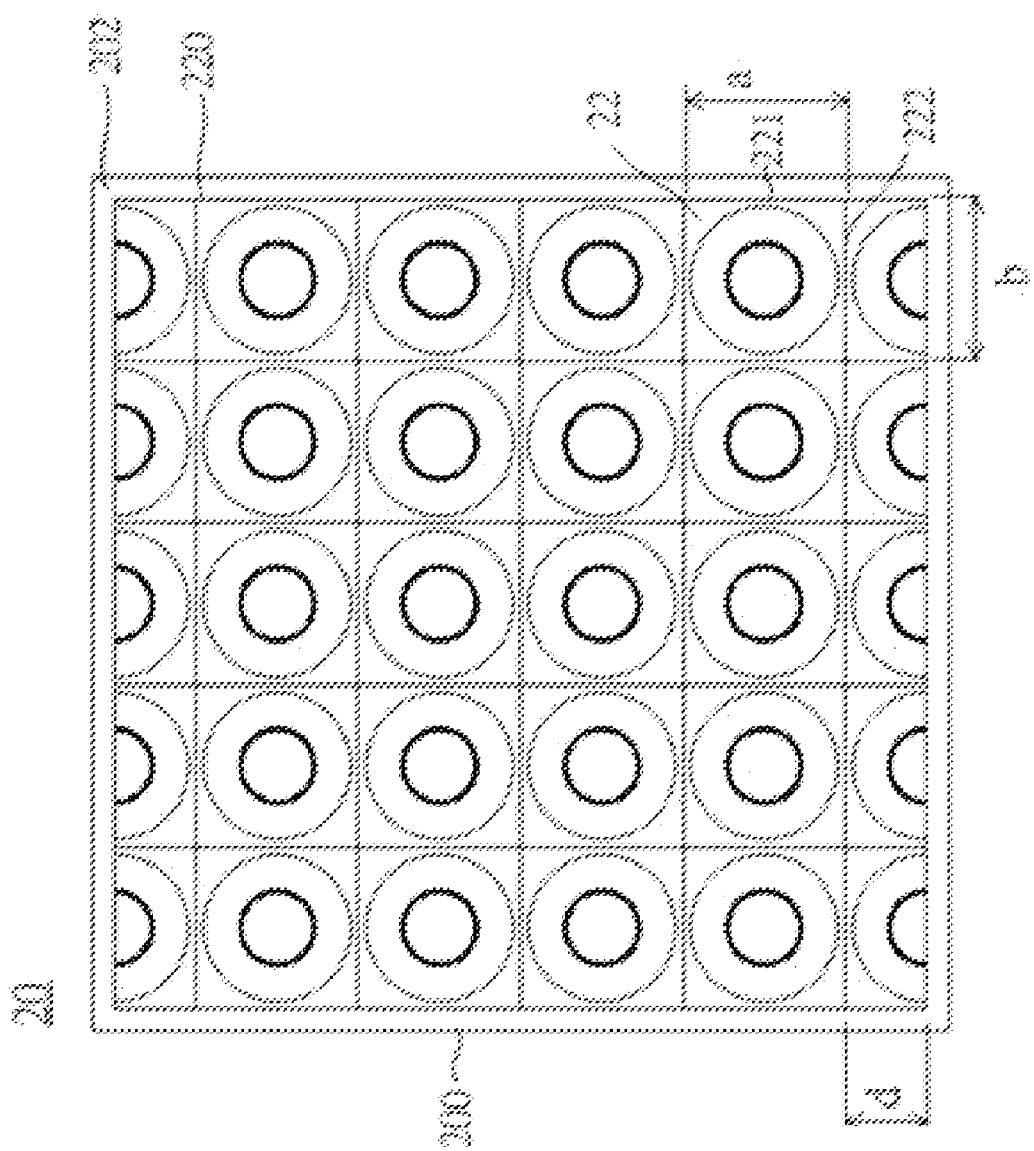
FIG. 4 illustrates a schematic rear view of the preferred embodiment of the double-sided microlens array of the present invention.
Figure 5:
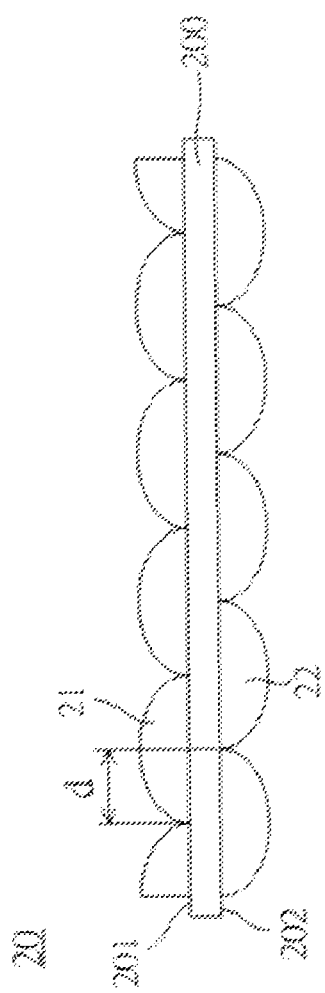
FIG. 5 illustrates a schematic side view of the preferred embodiment of the double-sided microlens array of the present invention.

Referring to FIG. 3, FIG. 4 and FIG. 5, which illustrate a schematic front view of a preferred embodiment of the double-sided microlens array of the present invention, a schematic rear view of the preferred embodiment of the double-sided microlens array of the present invention, and a schematic side view of the preferred embodiment of the double-sided microlens array of the present invention.

As shown in the figures, the double-sided microlens array 20 is consisted of a transparent base plate 200, a plurality of first micro lenslets 21 and a plurality of second micro lenslets 22, wherein the base plate 200 is a laminar transparent plate and has a first surface 201 and a second surface 202, the first surface 201 and the second surface 202 are parallel to each other and about the same size; the first micro lenslets 21 and the second micro lenslets 22 are disposed on the first surface 201 and the second surface 202 respectively.

Figure 6:
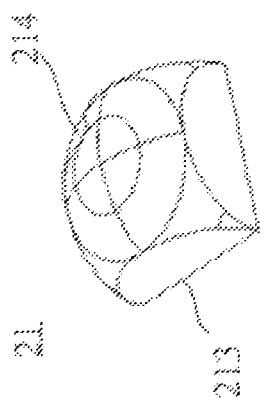
FIG. 6 illustrates a schematic external view of a preferred embodiment of the first microlens of the present invention.

With reference to FIG. 6 simultaneously, which illustrates a schematic external view of a preferred embodiment of the first micro lenslet of the present invention. As shown in the figure, each first micro lenslet 21 is a convex and has a curve surface 214, the bottom surface 213 of the first micro lenslet 21 is attached to the first surface 201 of the base plate 200, the curve surface 214 is protruded outwardly from the base plate 200 and could be chosen as a spherical structure and a non-spherical structure. The figure of the second micro lenslet 22 is the same as the first micro lenslet 21, and the second micro lenslet 22 has a bottom surface and a curve surface. The bottom surface is attached to the second surface 202 of the base plate 200. The curve surface is protruded outwardly from the base plate 200.

The figures of the first micro lenslet 21 and the second micro lenslets 22 can be rectangle or square in practice. Each of the first micro lenslet 21 and the second micro lenslets 22 has first sides 211 and 221 and second sides 212 and 222 respectively. The lengths of the first sides 211 and 221 are "a", and the lengths of the second sides 212 and 222 are "b". The double-sided microlens array 20 is consisted of optical diffractive elements, so that the first micro lenslets 21 and the second micro lenslets 22 complies with the classification of an optical diffractive element. The lengths of the first sides 211 and 221 and the second sides 212 and 222 are between 5 to 500 µm in order to meet the conditions of diffraction.

The plurality of first micro lenslets 21 are disposed on the first surface 201 in order to tightly line up the arrangement of an array, and the arrangement to the first micro lenslets 21 defines a first array pattern 210. The first array pattern 210 is consisted of several rows and columns of the first micro lenslets 21 so as to form a square grid pattern. The plurality of second micro lenslets 22 are disposed on the second surface 202 in order to tightly line up the arrangement of another array, and the arrangement to the second micro lenslets 22 defines a second array pattern 220. The second array pattern 220 is consisted of several rows and columns of the second micro lenslets 22 so as to form another square grid pattern. The position of the first array pattern 210 on the first surface 201 and the position of the second array pattern 220 on the second surface 201 has a comparative position difference "d", so that the first micro lenslets 21 and the second micro lenslets 22 are correspondingly misalignment.

As shown in the figures, the second array patterns 220 are extended along the directions of the first sides 211 and 221, thus the comparative position difference "d" is between the second array pattern 220 and the first array pattern 210. For another embodiment, the comparative position difference between the second array pattern 220 and the first array pattern 210 is along the directions of the second sides 212 and 222. For a further embodiment, the comparative position difference between the second array pattern 220 and the first array pattern 210 is along the directions of the diagonal lines of the first micro lenslet 21 and the second micro lenslet 22.

The main feature of the present invention is to build up the conditions of double diffractions by means of the double-sided microlens array 20, so that the phenomenon of double diffractions is generated through the first micro lenslets 21 and the second micro lenslets 22, and the energy of the reorganized laser beam from the double-sided microlens array 20 is evenly distributed. With the comparison of the present invention and the prior microlens array of single diffraction, the energy uniformity of the emergent laser beam is highly increased.

To meet with the condition of diffraction, the thickness of the base plate 200 is normally smaller than 1 mm, more preferably, it shall be below 0.5 mm. The comparative position difference "d" is set to be a predetermined scale to the lengths "a" of the first sides 211 and 221. For other embodiments, the comparative position difference is set to be a predetermined scale to the lengths "b" of the second sides 212 and 222 when the direction of comparative position difference is along the directions of the second sides 212 and 222. The comparative position difference is set to be a determined scale to the lengths of the diagonal lines of the first micro lenslet 21 and the second micro lenslet 22 when the direction of the comparative position difference is along the directions of the diagonal lines of the first micro lenslet 21 and the second micro lenslet 22. A recommended value to the predetermined scale is between 5% and 95%, and the best value is 50% according to the studies of the inventor.

Further, the better values of the lengths of the first micro lenslet 21 and the second lenslet 22 are between 100 and 200 μm. Practically, the optical conditions of a system can be optimized in order to achieve a best mode. The dimensions of the base plate 200 and the distribution scope of the arrays of the first micro lenslets 21 and the second micro lenslets 22 may be changeable according to the sectional area of the laser beam.

For an embodiment of the double-sided microlens array 20, the double-sided microlens array 20 is made of PMMA (Polymethylmethacrylate) and through the way of the plastic injection mode. The processes of the plastic injection mode are the steps of: making a mold based on the texture of the double-sided microlens array 20; and then injecting liquid plastic into the mold in order to be solidified for forming the doubled-sided microlens array 20.

Figure 7:
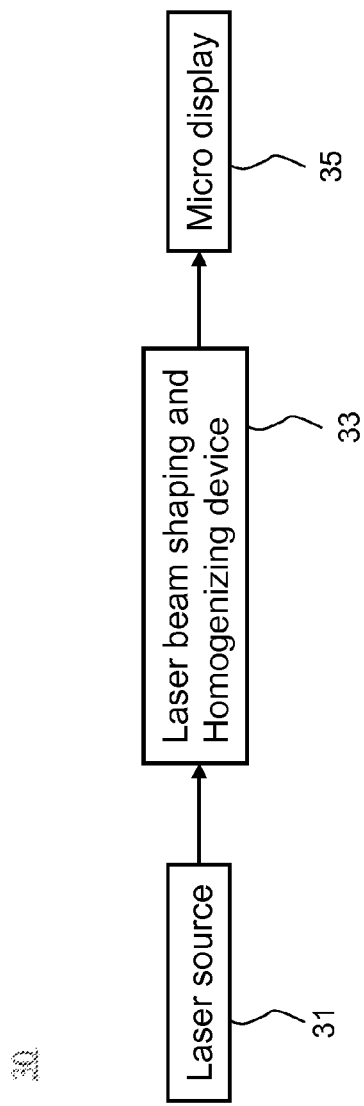
FIG. 7 illustrates a schematic view of a framework of a laser system of the present invention.

With reference to FIG. 7, which illustrates a schematic view of a framework of a laser system of the present invention. As shown in FIG. 7, the laser system 30 is a projection device and includes a laser source 31, a laser beam shaping and homogenizing device 33 and a micro display 35. The laser source 31 generally consists of three wavelength devices, such as red laser, blue laser and green laser. By means of an optical alignment system, the red laser, blue laser and green laser are thus integrated into a laser beam. The laser beam from the laser source 31 continuously passes through the laser beam shaping and homogenizing device 33, and the laser beam is adjusted to become a square and flat-top beam with the average uniformity of energy. The square and flat-top beam propagates to the micro display 35 with a small screen, and is then expended via an optical mechanism to be projected onto a screen.

Figure 8:
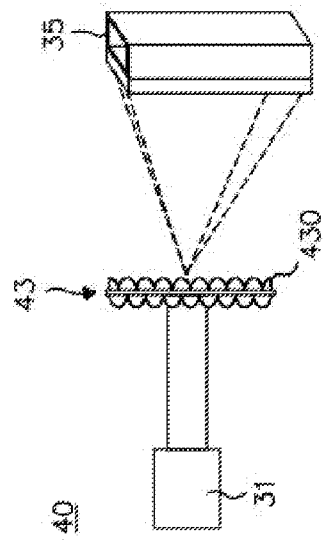
FIG. 8 illustrates a schematic view of a first preferred embodiment of the framework of the laser system and the laser beam shaping and homogenizing device of the present invention.

With reference to FIG. 8, which illustrates a schematic view of a first preferred embodiment of the framework of the laser system and the laser beam shaping and homogenizing device of the present invention. In the preferred embodiment, the laser beam shaping and homogenizing device 43 of the laser system 40 is consisted of a double-sided microlen array 430, and the double-sided microlens array 430 is described as aforesaid and may not be described any further hereinafter.

The double-sided microlens array 430 is disposed at the path of the laser beam, and the surface of the base plate is about vertical to the path of the laser beam. The laser beam through the double-sided microlens array 430 may have the phenomenon of diffraction, so that the illumination uniformity of the square beam projected onto the micro display 35.

With reference to FIG. 9, which illustrates a schematic view of a second preferred embodiment of the framework of the laser system and the laser beam shaping and homogenizing device of the present invention. In the preferred embodiment, the laser beam shaping and homogenizing device 53 of the laser system 50 is consisted of a double-sided microlens array 530 and a cylindrical lens 533. The double-sided microlens array 530 and the cylindrical lens 533 are disposed at the path of the laser beam. The cylindrical lens 533 is further adjust the aspect ratio of the laser beam form factor in order to meet with the requirements of the width and height of the micro display 35 and the screen frame.

With reference to FIG. 10, which illustrates a schematic view of a third preferred embodiment of the framework of the laser system and the laser beam shaping and homogenizing device of the present invention. In the preferred embodiment, the laser beam shaping and homogenizing device 63 of the laser system 60 consists of a double-sided microlens array 630, a cylindrical lens 633 and a micro vibration module 635. The double-sided microlens array 630 and the cylindrical lens 633 are disposed at the path of the laser beam. The vibration module 635 is connected to and drives the double-sided microlens array 630 for vibrations. Hence, the laser speckles can be eliminated so as to promote the illumination uniformity.

Further, the vibration module 635 is adapted to drive the double-sided microlens array 630 within the scope of several hundred micrometers (μm) in a fixed frequency for vibration. The fixed frequency should be set to be higher than an image frame rate. In practice, the micro vibration module 635 has a lot of embodiments, preferably one is an electrical and mechanical device with an electromagnetic structure.

According to above mentions, the double-sided microlens array, the laser beam shaping and homogenizing device and the laser system of the present invention adopts the comparative position difference between the first microlens array and the second microlens array to build up the conditions of diffraction, therefore the laser beam through the first microlens array and the second microlens array may generate two-time diffraction phenomena, so that the energy uniformity of the emergent laser beam is highly increased, and the laser system provides high-quality projected beam with uniform illumination.

Although the invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A laser beam shaping and homogenizing device, being adapted to shape and homogenize a laser beam and comprising:
   a double-sided microlens array, being disposed at the path of the laser beam and comprising:
      a base plate, having a first surface and a second surface, the first surface and the second surface being parallel to each other, wherein the first surface and the second surface are about vertical to the path of the laser beam;
      a plurality of first micro lenslets, each lenslet having a planar surface and smooth convex surfaces, wherein the first micro lenslets being disposed on the first surface of the base plate in order to tightly line up the arrangement of an array, and the arrangement to the first micro lenslets defining a first array pattern on the first surface; and a plurality of second micro lenslets, each second micro lenslet having a planar surface and smooth convex surfaces, and the second micro lenslets being disposed on the second surface of the base plate for being tightly lined up the arrangement of another array, so as to define a second array pattern on the second surface; wherein the first array pattern and the second array pattern are about the same, the position of the first array pattern on the first surface and the position of the second array pattern on the second surface having a comparative position difference, so that the first micro lenslets and the second micro lenslets are correspondingly misalignment;

a cylindrical lens, being disposed at the path of the laser beam and connected to the doubled-sided microlens array, the cylindrical lens being used for adjusting the aspect ratio of the laser beam in order to meet with the requirements of the width and height of a micro display which the laser beam projects to; and a micro vibration module, being connected to and drives the double-sided microlens array for vibrations, so as to eliminate the laser speckles of the laser beam and further promote the illumination uniformity.

2. The laser beam shaping and homogenizing device according to claim 1, wherein each first micro lenslet has a first side and a second side vertical to the first side, and the length of the first side and the second side is ranged between 5 and 500 µm.

3. The laser beam shaping and homogenizing device according to claim 1, wherein each second micro lenslet has a first side and a second side vertical to the first side, and the length of the first side and the second side is ranged between 5 and 500 µm.

4. The laser beam shaping and homogenizing device according to claim 3, wherein the direction of the comparative position difference of the first array pattern and the second array pattern is selected from the group consisting of: an extending direction along the first side and an extending direction along the second side.

5. The laser beam shaping and homogenizing device according to claim 1, wherein the distance between the first surface and the second surface is smaller than 1 mm.

* * * * *